United States Patent [19]

Astic et al.

[11] Patent Number: 5,760,553
[45] Date of Patent: Jun. 2, 1998

[54] SPEED CONTROL METHOD FOR AN ELECTRIC MOTOR

[75] Inventors: Georges Astic, Saint Marcel Les Valence; Denis Girardin, Alixan, both of France

[73] Assignee: Crouzet Appliance Controls, Montelier, France

[21] Appl. No.: 630,373

[22] Filed: Apr. 10, 1996

[30] Foreign Application Priority Data

Apr. 14, 1995 [FR] France .................... 95/04759

[51] Int. Cl.⁶ ........................................ H02P 7/62
[52] U.S. Cl. ........................ 318/244; 318/245
[58] Field of Search ........................ 318/244, 245, 318/268

[56] References Cited

U.S. PATENT DOCUMENTS

| | | | |
|---|---|---|---|
| 3,599,062 | 8/1971 | Crane et al. | 318/281 |
| 4,481,448 | 11/1984 | Bishop | 318/248 |
| 4,618,805 | 10/1986 | Hornung | 318/254 |
| 4,895,216 | 1/1990 | Fusimi et al. | 318/489 X |
| 5,075,613 | 12/1991 | Fisher | 318/809 |
| 5,558,476 | 9/1996 | Uchida et al. | 408/1 R |

FOREIGN PATENT DOCUMENTS 0564378   3/1993   European Pat. Off. .

OTHER PUBLICATIONS

Revue Generale de L'Electricite, No. 1, Jan. 1994, Paris France, pp. 24–27, XP 000423958, T. Castagnet "Commade Economique de Moteur par un Microcontroleur".
Electronik, vol. 35, No. 14, Jul. 1986, Munchen De, pp. 73–78, H. Sax et al "Mikrocomputer mit Sensorund Aktuator—Interface".

*Primary Examiner*—Bentsu Ro
*Attorney, Agent, or Firm*—Plevy & Associates

[57] ABSTRACT

A speed control method for controlling an electric motor by varying the supply duration of the motor, comprises the steps of:

initially storing, for a constant speed to be obtained, the curve of the current in the motor as a function of the supply duration;
  selecting a supply duration;
  measuring the resulting current in the motor; and
  correcting the supply duration so that the point defined by the supply duration and the resulting measured current converges towards a point of the curve.

4 Claims, 3 Drawing Sheets

SPEED CONTROL METHOD FOR AN ELECTRIC MOTOR

BACKGROUND OF THE INVENTION

1. Field of the Invention

The present invention relates to the speed control of an electric motor, in particular of an universal motor.

2. Discussion of the Related Art

Universal motors are more and more used in mass-produced equipment, such as washing machines, because a simple electronic control provides a large range of rotational speeds extending, in the example of washing machines, from a low washing speed to a high spin-drying speed.

FIG. 1 represents a conventional speed control circuit for a universal motor. The universal motor 10 comprises a stator winding 10-1 connected in series with a rotor winding 10-2. A tachometer 10-3 is conventionally used to monitor the motor speed.

The motor is supplied, usually from the mains voltage VAC, through a triac 12. A micro-controller 14 receives the speed information $\omega$ of the tachometer 10-3 and a speed reference $\omega c$. As a function of the difference between the measured speed $\omega$ and the speed reference $\omega c$, the micro-controller adjusts the conduction angle $\alpha$ of the triac 12 so that $\omega$ approaches $\omega c$.

Additionally, the micro-controller 14 monitors the motor current I measured across a shunt 16 connected in series with the triac 12. This current monitoring is necessary to avoid a destruction of the motor when its load torque is too high or when the tachometer 10-3 fails.

FIG. 2 represents voltage Vm across the motor 10 and current I flowing through the motor during a normal operating phase. At each half-wave of the mains voltage VAC, the triac 12 is switched on during a time interval that begins after the beginning of the half-wave and ends when current I crosses zero at a time that depends on the current/voltage phase relationship in the circuit. The term "conduction angle" $\alpha$ designates the duration between the time when the triac is turned on and the time when the voltage of the half-wave crosses zero.

This motor control, by varying the conduction angle of the triac, has the advantage of being simple and inexpensive. However, it produces parasitic pulses on the mains.

FIG. 3 illustrates a motor control that produces less parasitic pulses. Here, the voltage provided to the motor is chopped at a high constant frequency 1/T, and the duty cycle of this chopping is varied. The time intervals during which the motor 10 is supplied, also designated by $\alpha$, are equivalent to the conduction angle $\alpha$ of FIG. 2.

In mass-production, like in the case of washing machines, it is desired to reduce the costs without perceptibly decreasing the quality.

SUMMARY OF THE INVENTION

An object of the invention is to provide a speed control that can be implemented by means of a particularly simple and cheap circuit.

To achieve this object, the present invention provides a motor speed control, in particular for a universal type motor, that does not use a tachometer. Accordingly, the invention provides a speed control method for controlling an electric motor by varying the supply duration of the motor, comprising the steps of initially storing, for a constant speed to be obtained, the curve of the current in the motor as a function of the supply duration; selecting a supply duration; measuring the resulting current in the motor; and correcting the supply duration so that the point defined by the supply duration and the resulting measured current converges towards a point of the curve.

According to an embodiment of the invention the supply time duration corresponds to a conduction angle.

According to an embodiment of the invention the supply duration is iteratively corrected by steps of higher amplitude than the difference, at a constant current, between the curve and said point.

According to an embodiment of the invention the measured current is corrected as a function of the motor supply voltage, before being compared with said curve.

According to an embodiment of the invention a plurality of curves corresponding to a plurality of supply voltages are stored for each speed to be obtained, one of these curves being selected as a function of a measured value of the supply voltage.

BRIEF DESCRIPTION OF THE DRAWINGS

The foregoing and other objects, features, aspects and advantages of the invention will become apparent from the following detailed description of preferred embodiments when taken in conjunction with the accompanying drawings.

DETAILED DESCRIPTION

Figure 1:
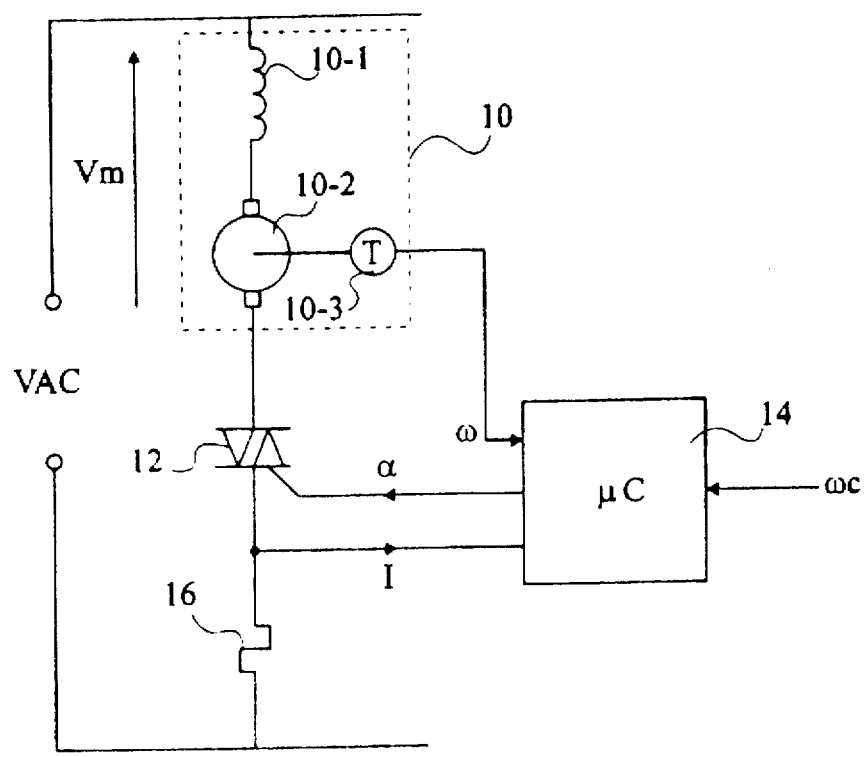
FIG. 1, above described, illustrates a conventional speed control circuit for a universal motor.
Figure 2:
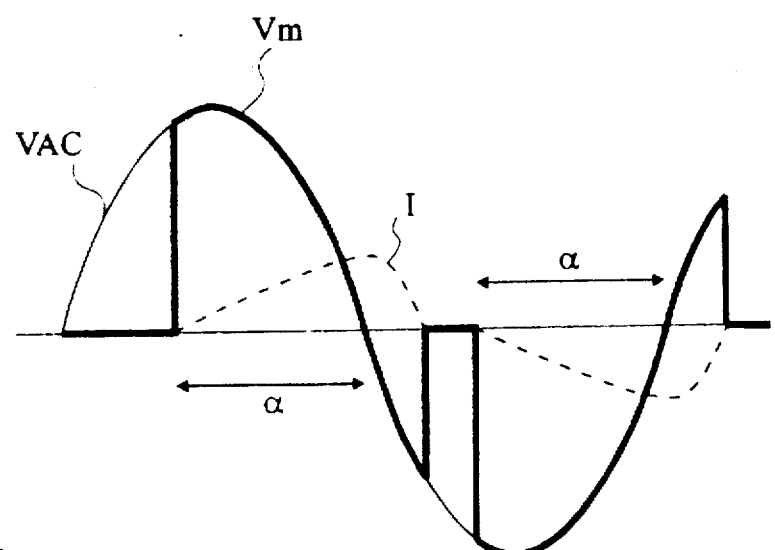
FIGS. 2 and 3 illustrate two conventional control modes of a motor.
Figure 3:
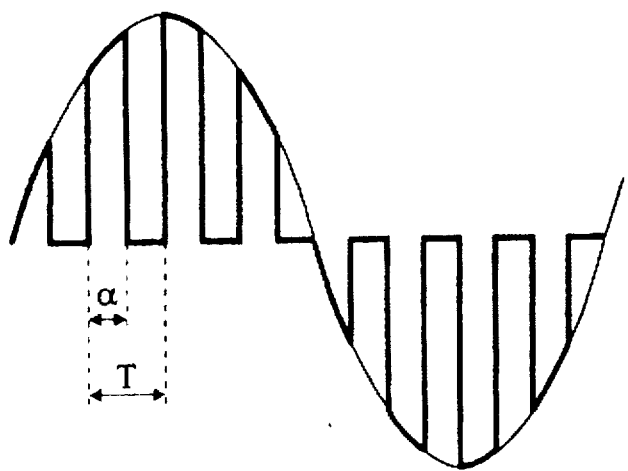

To reduce the cost of a motor speed control system, in particular for a universal motor, the invention omits the conventionally used speed sensor, such as the tachometer 10-3 of FIG. 1, while providing a suitable speed control.

Some known sensor-less speed control systems use the back-electromotive force (BEMF) of a motor, which is directly proportional to the speed. While the BEMF can be measured in motors having a magnetized rotor (such as synchronous motors or series motors with a permanent magnet), it cannot be measured in universal motors that have no magnetized element.

According to the invention, one starts from the assumption that the current I circulating in a motor is expressed by:

$$I = f(\alpha, \omega, V),$$

wherein $f$ is an unknown function, $\alpha$ the supply duration of the motor (substantially the conduction angle in the case of FIG. 1), $\omega$ the rotational speed of the motor, and V the voltage applied to the motor. The variables I and V may be peak values, RMS values, etc. Preferably the peak values are used, since they have a fast variation and are easier to detect.

The regulation method according to the invention comprises a preliminary step that consists in tracing, for each speed at which the motor is to be regulated, the current I as a function of the supply duration $\alpha$, while assuming that the supply voltage V is constant and equal to its nominal value.

These curves are obtained experimentally by varying α and measuring the current I for each value of α while the motor speed is maintained constant, at the desired value, by using a brake.

Figure 4:
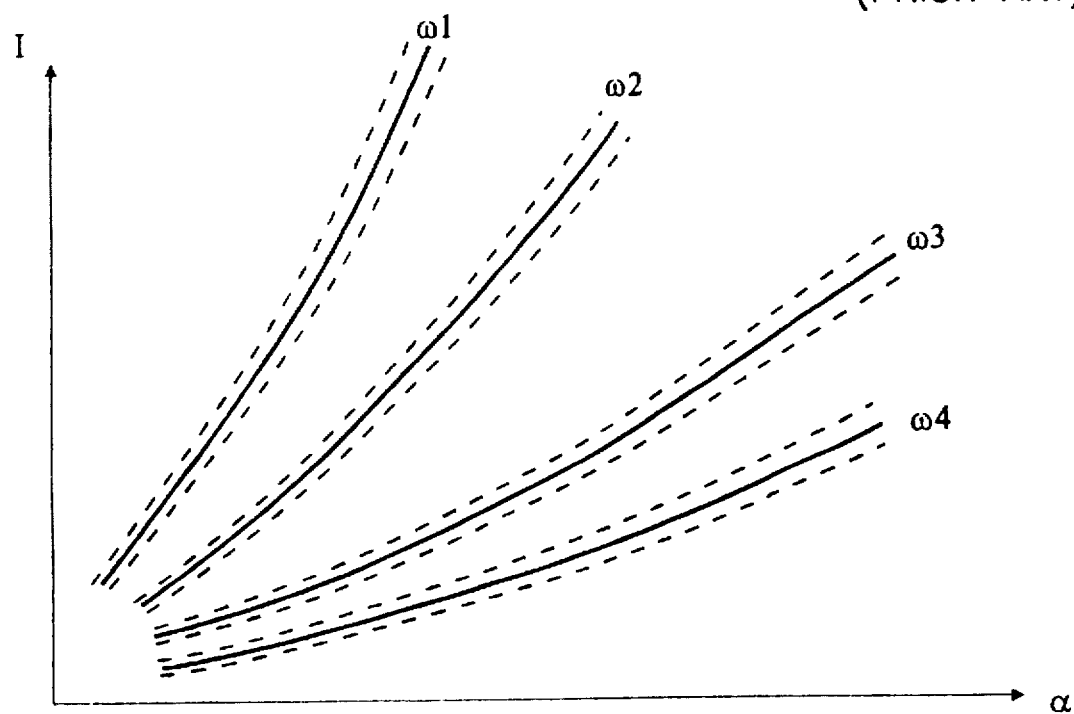
FIG. 4 represents a family of curves provided according to the invention to carry out a speed control.

FIG. 4 represents a family of four schematic curves ω1–ω4 obtained in this way, these curves corresponding to increasing speeds. The higher the speed, the lower the current I.

Of course, each type of motor may have a different family of curves. However, in the case of a mass-production, in particular for washing machines, the motors have a constant quality and the family of curves practically does not vary from one motor to the other.

Once the family of curves has been experimentally obtained, these curves are stored, for example in a ROM of a micro-controller. For example, a series of values of α that are to be used in the method is selected and, for each α value, the corresponding values of the current I of the curves of the family are stored.

In a speed control method according to the invention, that will be disclosed in detail hereunder, the speed reference is used to select one curve of the family, the control variable is the supply duration α, and the feedback variable is the value of the motor current I.

Figure 5:
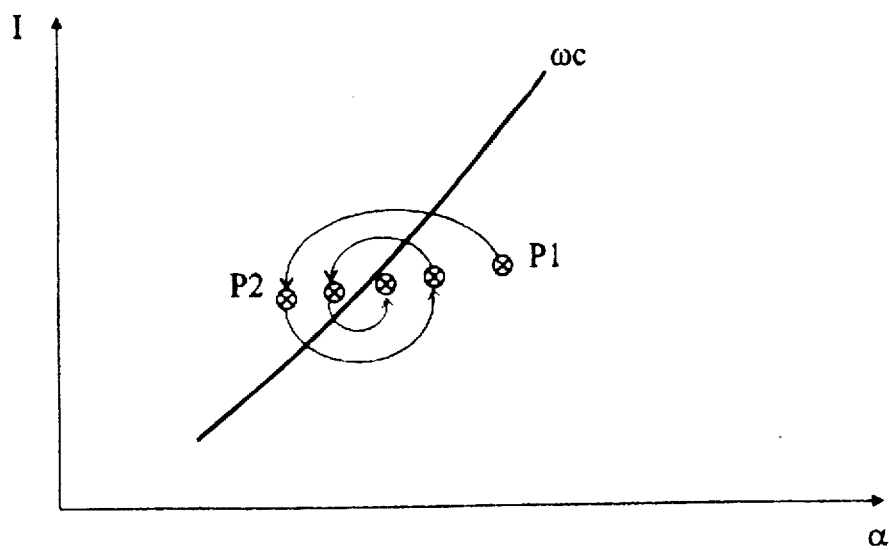
FIG. 5 illustrates an example of use of one of the curves of FIG. 4 to obtain a speed control according to the invention.

FIG. 5 illustrates the method according to the invention to regulate the motor speed at a value ωc. The value ωc is provided as a reference value, for example to a micro-controller, and selects a corresponding curve ωc of the stored family. First, an initial value α is selected, this value being arbitrary or an estimate. The measured current I and the angle α that provides this current, define a point P1 that is for example under the reference curve ωc, i.e. at a speed higher than the reference speed. By measuring the distance, a reduction Δα of the triac's conduction angle is determined for reducing the speed by reducing the current I. Of course, the servo-control law for α and I to remain at the speed reference ωc can vary so that the reference is reached more or less quickly. In the example of FIG. 5, the servo-control law is of an iterative type and causes an oscillation of the actual speed around the reference ωc. Other smoother laws could be selected to provide a convergence by a regular increase or decrease towards the reference value ωc.

Of course, the method according to the invention uses one curve for each speed at which it is desired to be able to regulate the motor. In many cases, for example in washing machines, the number of speeds is limited and there is no drawback in storing all the curves. In other cases, some curves to be used may be interpolated between two stored curves, or points of a same curve may be obtained by interpolation, or the curves may be obtained from a mathematical model.

As indicated above, the family of constant speed curves is obtained for one supply voltage V equal to its nominal value. However, this voltage, in particular if it corresponds to the mains voltage, is likely to vary within given limits and can have a significant influence on the family of curves. It can be admitted that the curves ω are slightly modified by the variations of the supply voltage. The measure of the supply voltage will enable an adaptation of the curves ω to the variations of the mains voltage. The position of a reference curve ωc will thus be corrected, as indicated by dotted lines in FIG. 4, to take into account the actual supply voltage. This reference curve ωc will be shifted towards the horizontal axis when the mains voltage V decreases, and in the opposite direction when the mains voltage increases. This correction of the curve ωc does not change the servo-control laws described above.

Figure 6:
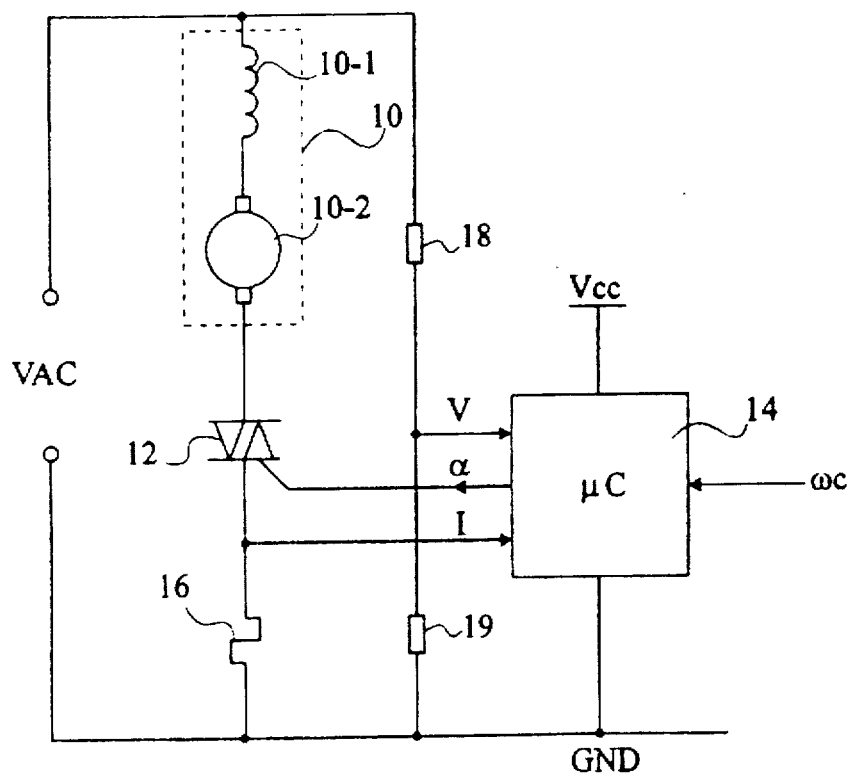
FIG. 6 represents an embodiment of a regulation circuit implementing the method according to the invention.

FIG. 6 illustrates an embodiment of a speed control circuit implementing the above-disclosed method. Same elements as in FIG. 1 are designated by same reference characters. In contrast with the conventional circuit of FIG. 1, the motor 10 of FIG. 6, does not have a tachometer connected to the microcontroller 14. This micro-controller 14 still receives a current information I measured across the shunt 16 and provides the conduction angle α of the triac 12. The feedback variable is no longer the speed measure ω provided by the tachometer of FIG. 1 but the current I of the motor. The micro-controller 14 stores in its ROM the family of curves, one of the curves being selected by the speed reference ωc. Additionally, the micro-controller 14 receives an indication of the mains voltage V through a resistor bridge 18–19, in order to implement one of the above-mentioned corrections to account for variations of the peak voltage of the mains. Of course, the program of the micro-controller implements the regulation method disclosed in connection with FIG. 5.

While the invention has been disclosed in connection with a universal motor controlled by a triac, it applies to any type of motor and to any type of control with a variable supply duration. Those skilled in the art will note that the invention could also be implemented by analog circuitry.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A method for controlling the speed of an electric motor by varying the supply duration (α) of said motor, comprising the steps of:

initially storing, for a constant speed to be obtained, the curve of the current (I) in the motor as a function of said supply duration;

selecting a particular said supply duration;

measuring the resulting current in said motor resulting from said selection; and iteratively correcting said supply duration so that the point (α,I) defined by said supply duration and said resulting measured current converges towards a point on said curve, wherein said iterative correction is accomplished by steps of higher amplitude than the difference, at a constant current, between said curve and said point (α,I).

2. The method of claim 1, wherein the supply duration corresponds to a conduction angle.

3. A speed control method for controlling an electric motor (10) by varying the supply duration (α) of the motor, comprising the following steps:

initially storing, for a constant speed to be obtained (wc), the curve of the current (I) in the motor as a function of the supply duration;

selecting a supply duration;

measuring the resulting current in the motor; and correcting the supply duration so that the point (α,I) defined by the supply duration and the resulting measured current converges towards a point on the curve, wherein the measured current (I) is corrected as a function of the motor supply voltage (V), before being compared with said curve.

4. A speed control method for controlling an electric motor (10) by varying the supply duration (α) of the motor, comprising the following steps:

initially storing, for a constant speed to be obtained ($\omega c$), the curve of the current (I) in the motor as a function of the supply duration;

selecting a supply duration;

measuring the resulting current in the motor; and correcting the supply duration so that the point ($\alpha.I$) defined by the supply duration and the resulting measured current converges towards a point on the curve, wherein said curve is selected from a plurality of curves corresponding to a plurality of supply voltages for each speed to be obtained ($\omega c$), said curve being selected from said plurality as a function of a measured value of the supply voltage (V).

* * * * *